(12) United States Patent
Rimi et al.

(10) Patent No.: US 7,480,354 B2
(45) Date of Patent: Jan. 20, 2009

(54) METHOD AND APPARATUS FOR CHANNEL ESTIMATION AND CELL SEARCH IN CELLULAR COMMUNICATION SYSTEMS, AND CORRESPONDING COMPUTER PROGRAM PRODUCT

(75) Inventors: Francesco Rimi, Alcamo (IT); Alberto Serratore, Catania (IT); Giuseppe Avellone, Palermo (IT); Francesco Pappalardo, Paternò (IT); Agostino Galluzzo, Palma di Montechiaro (IT)

(73) Assignee: STMicroelectronic S.r.l., Agrate Brianza (IT)

( * ) Notice: Subject to any disclaimer, the term of this patent is extended or adjusted under 35 U.S.C. 154(b) by 703 days.

(21) Appl. No.: 11/051,561

(22) Filed: Feb. 4, 2005

(65) Prior Publication Data
US 2005/0227725 A1 Oct. 13, 2005

(30) Foreign Application Priority Data
Feb. 6, 2004 (EP) .................................. 04425077

(51) Int. Cl.
*H03D 1/00* (2006.01)
*H04B 7/216* (2006.01)
(52) U.S. Cl. ...................... 375/343; 370/320
(58) Field of Classification Search ................ 375/343, 375/130, 341, 150, 145, 316, 350, 319; 455/67.3, 455/502, 503, 334; 370/320, 321, 335, 342, 370/347
See application file for complete search history.

(56) References Cited

U.S. PATENT DOCUMENTS

| | | | |
|---|---|---|---|
| 6,765,894 B1 * | 7/2004 | Hayashi | 370/335 |
| 7,321,584 B2 * | 1/2008 | Lee et al. | 370/350 |
| 2004/0043746 A1 * | 3/2004 | Hiramatsu | 455/334 |

OTHER PUBLICATIONS

Honore, Frank, et al., "Implementation Options for WCDMA," Texas Instruments Inc., *IEEE*, 2000, pp. 3702-3705.

(Continued)

*Primary Examiner*—Khai Tran
(74) *Attorney, Agent, or Firm*—Lisa K. Jorgenson; Dennis M. de Guzman; Seed IP Law Group PLLC

(57) ABSTRACT

In order to perform, according to a received signal (r), a channel-estimation procedure and a cell-search procedure in cellular communication systems, there are executed at least one first operation of correlation of said received signal (r) with secondary synchronization codes (SSC) and a second operation of correlation of said received signal (r) with known midamble codes (mid, MPL, MPS), whilst said channel-estimation procedure comprises a third operation of correlation of at least part of said received signal (r) with known midamble codes (mid, MPL, MPS), said first, second, and third correlation operation being executed by sending at least part ($e_{midamble}$) of said received signal (r) to an input of a correlation bank. There are envisaged the operations of: sending, in a first time interval, the received signal (r) to said correlation bank for executing the first operation of correlation of said received signal (r) with secondary synchronization codes (SSC); sending, in a second time interval, at least part ($e_{midamble}$) of said received signal (r) to said same correlation bank for executing the second operation of correlation of said received signal (r) with known midamble codes (mid, MPL, MPS); sending, in a second time interval, the received signal (r) to said same correlation bank for executing the third operation of correlation of at least part ($e_{midamble}$) of said received signal (r) with known midamble codes (mid, MPL, MPS). Possible application is in mobile communication systems based upon standards such as UMTS, CDMA2000, IS95 or WBCDMA.

28 Claims, 5 Drawing Sheets

OTHER PUBLICATIONS

Lee, Kang-Min, et al., "An Initial Cell Search Scheme Robust to Frequency Error in W-CDMA System," Digital Communication Lab, *IEEE*, 2000, pp. 1400-1404.

Shah, Nitin J., et al., "Portable Broadband Internet Access: System and Services," ArrayComm, Inc., *IEEE*, 2000, pp. 1207-1215.

* cited by examiner

METHOD AND APPARATUS FOR CHANNEL ESTIMATION AND CELL SEARCH IN CELLULAR COMMUNICATION SYSTEMS, AND CORRESPONDING COMPUTER PROGRAM PRODUCT

BACKGROUND OF THE INVENTION

1. Field of the Invention

The present disclosure generally relates to telecommunication techniques and has been developed with particular but not exclusive attention paid to its possible application to telecommunication systems based upon the CDMA/3GPP TDD standard (where said acronyms stand for Code-Division Multiple Access/Third-Generation Partnership Project Time Division Duplex), in particular in its High-Chip-Rate option (operating at 3.84 Mcps).

Even though in what follows, for reasons of clarity and simplicity of exposition, practically exclusive reference will be made to the aforesaid application, it should, however, be borne in mind that the scope of the present disclosure is more general. The disclosure is, in fact, applicable to all telecommunication systems in which operating conditions of the type described in what follows occur: by way of non-exhaustive example, the satellite-telecommunication systems and the mobile cellular systems corresponding to the UMTS, CDMA2000, IS95 or WBCDMA standards may be cited.

2. Description of the Related Art

To enable acquisition of a base station by a mobile terminal included in a telecommunication system based upon the 3GPP standard TDD mode or the like, the corresponding receiver requires means capable of carrying out the function of frame synchronization and identification of the so-called codegroup. The possibility of performing the said functions is essential for execution of the subsequent steps in the context of the cell-search system.

In particular, when a mobile terminal is turned on, it does not have any knowledge of the timing of the transmitting cell to which it is to be assigned. The 3GPP standard, therefore, proposes an initial cell-search procedure for acquiring the cell signal and synchronizing therewith.

Said procedure basically comprises three steps, which in the TDD version are indicated as follows:

Primary Synchronization Code Acquisition (first step);
Code group (i.e., cell code group) Identification and Slot Synchronization (second step); and
Downlink Scrambling Code, Basic Midamble Code Identification and Frame Synchronization (third step).

In the implementation of the second step described above, it is assumed that the primary synchronization code, which indicates the position of the generic frame of the synchronization slot has previously been acquired during the first step.

To obtain at this point the slot synchronization and identify the codegroup, to which the offset of the cell is associated, in the second step the Secondary Synchronization CHannel (SSCH) is used, on which there are transmitted, in each synchronization slot, three secondary synchronization codes or words of 256 chips (i.e., letters), where the generic code is designated by Cm, with m ranging from 0 to 15.

In the TDD version, as mentioned previously, in each slot containing the secondary channel SCH there are three secondary synchronization codes SSC. The standard defines four possible sets of three codes; the combination of the set of three codes SSC and their phases defines the codegroup. Each codegroup identifies: one slot offset between the start of the slot and the start of the code on the secondary channel SCH; four possible basic midambles; and one scrambling code, associated to each of said midambles. In the third step of the cell search, there is defined which midamble is used in the primary channel P-CCPCH (Primary Common Control Physical CHannel) and hence the corresponding scrambling code. In the third step, in the received signal the portion of slot of the primary channel P-CCPCH where the midamble falls is considered, and on said portion there is performed a correlation with each of the four possible midambles known to the receiver and there is defined which midamble has been transmitted according to the correlation results. Normally, the midamble which has the highest correlation energy is chosen.

The detection of the midamble is moreover necessary for executing a channel-estimation procedure.

To carry out channel estimation in the TDD 3.84 mode, the sequence present in the midamble can be used (i.e., a numeric sequence of values $\pm 1$, $\pm j$), which is known to the receiver and is sent in the generic data slot DPCH (Dedicated Physical CHannel) between two data blocks referred to as Data1 and Data2.

The rules of construction of the generic midamble are, however, described in the 3GPP standard. From a basic midamble sequence of length $L_{basic}$=KW, where K is the number of users and W a known quantity, each user midamble of length $L_{midamble}$ can be constructed by carrying out an operation of shift of the basic midamble sequence itself by the known amount W.

The midamble sequence received at the user terminal, designated in what follows as $e_{midamble}$, is the convolution between the transmitted midamble sequence, mid, which is also the midamble sequence known to the receiver, and the impulse response of the transmission channel h(t):

$$e_{midamble} = \text{mid} * h(t) \quad (1)$$

Since the transmitted midamble sequence mid is known to the receiver, the receiver can reconstruct, from the received signal, the channel impulse response h(t), i.e., its coefficients.

In the case of down-link transmission, i.e., of transmission from the base station to the mobile user terminal, the signals of the generic K users are transmitted simultaneously by the base station. In this case, the channel estimation to be performed in the user terminal can be made using just one midamble sequence, i.e., the j-th one. In this case, the vector of the channel estimates $h_w$ becomes:

$$h_w = [h_1^{(j)}, h_2^{(j)}, \ldots, h_w^{(j)}] \quad (2)$$

Furthermore, it is important to consider the fact that the channel introduces a delay, or, rather, it introduces signal "tails", which are estimated as corresponding to an impulse response of W chips. It is clear that the first (W−1) chips of the received midamble $e_{midamble}$ are affected by the intersymbol interference of the last (W−1) chips of the preceding data block Data1. Only the sequence of subsequent chips of length. L=KW can in actual fact be used for performing the estimation of the impulse response of the channel.

Assuming that the characteristics of the radio channel are invariant, or at least vary little, during a time interval of one slot, a simple method for obtaining the vector of channel estimates $h_w$, for the j-th user, is the cross-correlation between the last chip sequence of length L=KW of the received midamble and a set of delayed replicas of the expected or known midamble, which is generated locally by the user terminal and which is designated, as a whole, by mid like the transmitted midamble. The results of these cross-correlations are the elements or channel coefficients sought and make up the so-called channel profile (which can be reduced to just W values).

A possible improvement in the channel estimation can be obtained by averaging on a number of windows having W elements, each obtained via cross-correlation between the last L=KW chips of the received midamble $e_{midamble}$ and the delayed replicas of the transmitted or known midamble mid of each user that is active in that precise slot within the service cell.

In the techniques known to the state of the art, the steps corresponding to the cell-search procedure and to the channel-estimation procedure are implemented using different subsystems based upon separate sections of correlation, which obtain, in a cascaded way, the parameters of interest.

The first subsystem performs the second step of the cell search, extracting all the parameters required by the synchronization procedure of the standard along with the information useful for execution of the subsequent third step of the cell-search procedure, in particular, the codegroup. Said third step, according to the information already obtained, carries out appropriate processing on the received signal. Said processing normally consists of a correlation between the received signal of an appropriate section of the synchronization slot representing the midamble of the primary channel P-CCPCH and the four possible midamble codes, according to the parameters estimated in the second step.

The channel-estimation procedure, or, more precisely, the procedure of estimation channel of the coefficients to be used then in the procedure of demodulation of the data portion, is carried out normally on the midamble of the generic received slot. Said procedure has many points in common with the third step of the cell-search procedure. The differences lie in the fact that the generic data channels can make use of two types of midambles of different lengths, a first, long, midamble MPL of 512 chips, which is equal to the one used in the primary channel P-CCPCH, and a second, short, midamble MPS of 256 chips. It is to be noted that the type of midamble used in the generic data burst is determined during the cell-search procedure in the second and third steps via appropriate tables defined by the 3GPP standard TDD mode. The channel P-CCPCH always uses a long midamble (512 chips).

Furthermore, in the case of the channel-estimation procedure, it is necessary to correlate the received midamble $e_{midamble}$, or part thereof, with a certain number of delayed replicas of the expected midamble mid. Said operation of correlation with delayed replicas enables definition of the complex weights or coefficients characterizing the possible paths present on the channel.

FIG. 1 shows a parallel-architecture device for implementing the second step of the cell-search procedure in the TDD mode, known from the Italian patent application TO2002A001082, filed in the name of the present applicant.

The received signal r goes at input to a block designated by 110, which executes a first operation of correlation on a first sequence of 16 chips.

The received signal r at output from block 110 is sent to a bank of correlators 111, which constitutes the correlation section. The samples of the received signal r are moreover stored in a storage unit 112.

The bank of correlators 111 comprises just four correlator circuits, one for each code set. The bank 111 receives, in fact, from a code-generating system designated by 113, four "first" codes SSC, each belonging to and identifying one of the four possible code sets in the context of the set of codes SSC.

Such codes SSC are in number of twelve, and each code set comprises a "first" code, which identifies the set, and a subset of remaining codes, which comprises the other two codes of the set.

The operation of correlation carried out in block 111 is hence able to supply at output an estimate of the received code set.

In this regard, a unit for search of the maximum value, designated by 114, receives from the bank of correlators 111 the energies corresponding to the four first codes SSC supplied by the system and supplies at output a first code SSC provided with the best correlation energy, along with the corresponding phase offset. In this way, there is hence identified a code set CS, to which said first code SSC belongs.

The first code SSC and its phase offset are designed to be sent on to a comparison block 115, whilst the information on the code set is sent to a controller designated by 116.

The controller 116 supervises operation of the circuit and, in particular, is designed to supply, to the code-generating system 113, the information on the four "first" codes SSC to be generated for identifying the four code sets.

On the basis of the first code and of the corresponding code set CS identified via the search for the maximum carried out in unit 114, the controller 116 sends, to the code-generating system 113, the information on which other codes SSC are to be generated for the operation of correlation with the received signal r, stored in the storage unit 112.

Said other codes are simply the two remaining codes SSC comprised in the subset that completes the code set corresponding to the first code selected via the search performed in the unit 114.

Provided upstream of the bank 111 is a multiplexer 120, which, driven by the controller 116, selects the output of the block 110 or else the output of the storage unit 112, in order to send it to the bank 111.

In this way, initially, in addition to being stored in the unit 112, the received signal r is sent directly to the block 111, where it is correlated with the four "first" codes that identify the four code sets coming from block 113.

Subsequently, once the reference code set has been identified—as a result of the search performed in the unit 114—, the samples of the received signal r stored in the unit 112 can be sent to the block 111 for being correlated with the two remaining codes of the aforesaid code set.

The bank of correlators 111 is provided with a correlator memory 121, in which the first code SSC of the detected code set is stored.

According to the information corresponding to the selected code set CS, the controller 116 commands the code-generating system 113 to generate the two codes corresponding to the two codes that are missing to compose the set of three codes of the code set CS, in order to perform a correlation with the samples of the received signal r stored in the storage unit 112.

The result of this correlation operation (carried out, so to speak, "recycling" two of the correlators contained in the bank 111) is also supplied to block 115, where there is recomposed the set of three codes of the code set CS, which can be used—along with the corresponding phases—for the comparison with the standard tables in order to extract the corresponding parameters from the table contained in the comparison block 115.

FIG. 2 shows a parallel-architecture device of a known type for implementing the third step of the cell-search procedure in TDD mode, which envisages sending the received signal r to the input of a block for extraction of the midamble 150, which extracts the part of slot in the received signal r that contains the received midamble $e_{midamble}$. Placed downstream of said block for extraction of the midamble 150 is a block of correlators 151, comprising four correlators. For the third step of the cell-search procedure, it is assumed that all the necessary information, among which the codegroup-CD, has been received from the previous step. According to said information, the part of received signal r is correlated by the block of correlators 151, within the appropriate time window, which is selected via the block for extraction of the midamble 150, with the local replicas of the four possible expected midamble codes MPL, which belong to the codegroup identified previously. Said four possible midamble codes MPL are supplied in parallel by an appropriate midamble-code generator 152. The resulting correlation energies are supplied to a unit for detection of the maximum value 153, which identifies the code provided with the highest correlation energy and sends it to a comparison block 155, in which, through a search in an appropriate look-up table, scrambling codes SCR corresponding to the cell are obtained. The reference number 156 designates a controller for handling the operations of the midamble-extraction block 150, of the midamble-code generator 152, and of the comparison block 155.

The sequence or burst associated to the primary channel P-CCPCH on which the third step of the cell-search procedure is to be performed is transmitted in concomitance with the first secondary channel SSCH of each frame.

Hence, the solutions according to the known art require allocating a certain amount of memory and, consequently, area of chip, with a consequent power consumption for implementing the sections of correlation necessary for the cell-search procedure and for the channel-estimation procedure.

BRIEF SUMMARY OF THE INVENTION

An embodiment of the present invention provides a solution capable of performing the functions described previously in a more compact way, so as to enable the cell-search procedure and the channel-estimation procedure to be carried out by a simplified hardware, reducing the computational complexity and obtaining a corresponding reduction of the memory required and of the power consumption.

According to the present invention, a method is provided having the characteristics referred to specifically in the claims that follow. The invention also regards the corresponding apparatus, as well as the computer program product directly loadable into the memory of a computer, the said computer product comprising software code portions that perform the method according to the invention when the product is run on a computer.

The solution according to one embodiment of the invention envisages simplification of the processing circuits and of the size of the memory required, moreover reducing the computational complexity.

As compared to the known solutions, the solution proposed herein, which is based upon a technique of recycling of the data acquired, is simpler, occupies less area, and consumes less power.

BRIEF DESCRIPTION OF THE DRAWINGS

One or more embodiments of the invention will now be described, purely by way of non-limiting examples, with reference to the annexed drawings, in which.

DETAILED DESCRIPTION

Embodiments of a method and apparatus for channel estimation and cell search in cellular communication systems, and corresponding computer program product are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 3:
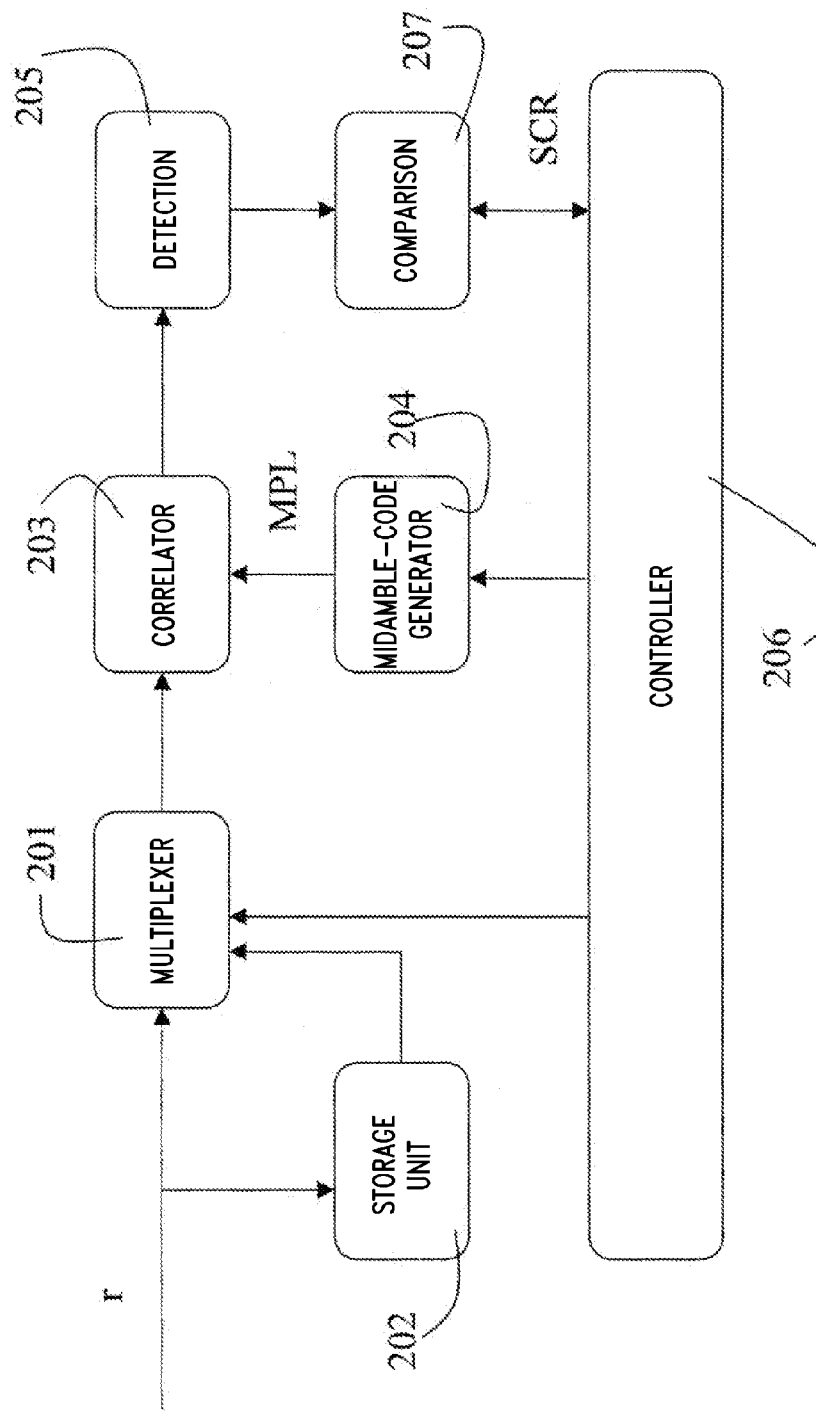
FIG. 3 shows a device for implementing the third step of the cell-search procedure according to one embodiment of the invention.
Figure 4:
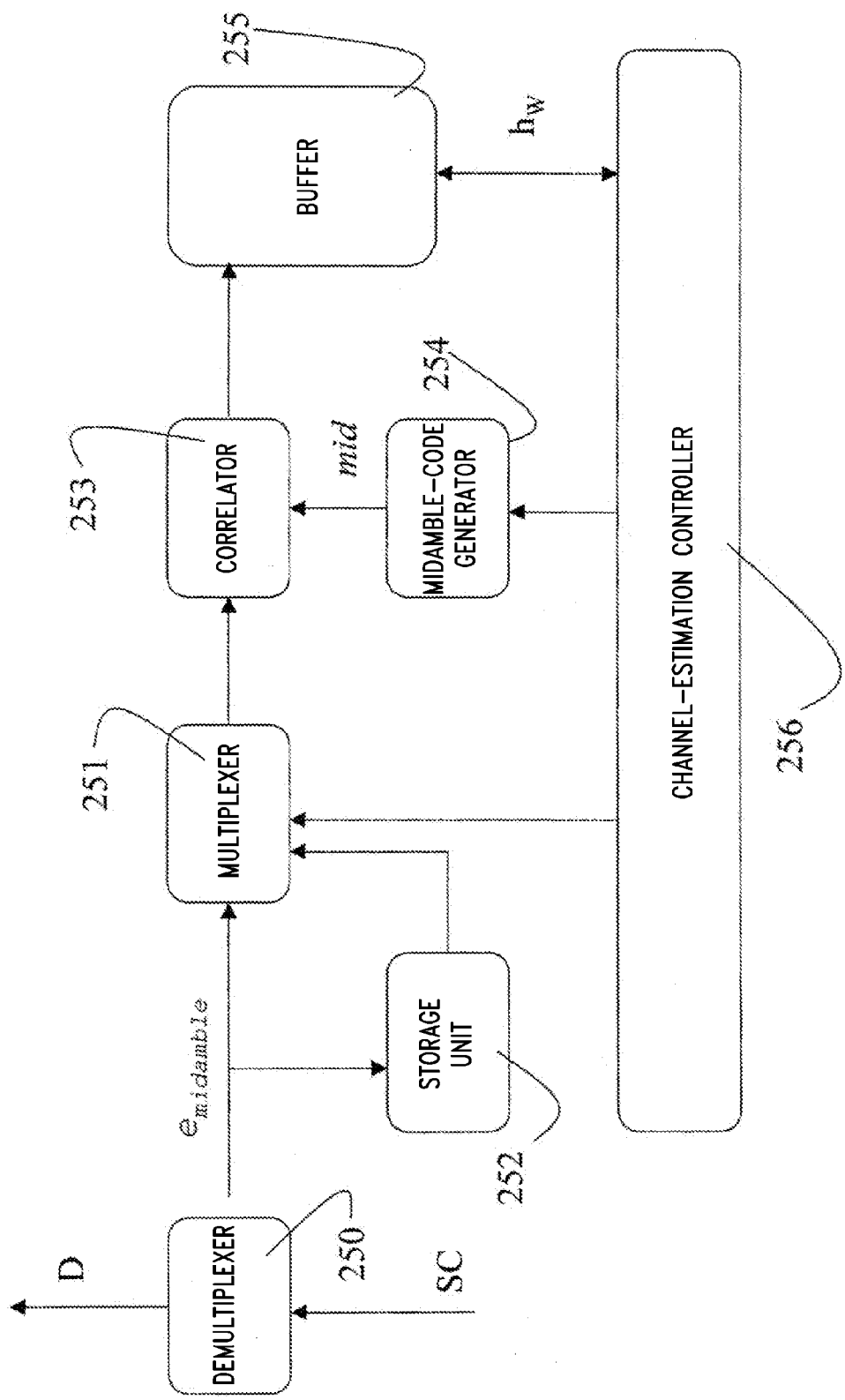
FIG. 4 shows a device for implementing the channel-estimation procedure according to one embodiment of the invention.

With reference to FIGS. 3 and 4, in the ensuing treatment two devices will be described, for implementing the third step, i.e., the cell-search procedure and the channel-estimation procedure, respectively, the corresponding architectures of which are introductory for the apparatus described with reference to FIG. 5.

FIG. 3 illustrates a serial-architecture device for implementing the third step of the cell-search procedure according to one embodiment of the invention.

In said device, the received signal r is sent at input to a multiplexer 201 and to a storage unit 202. There is further envisaged a controller 206 for controlling operation of the various modules that make up said device. The multiplexer 201, driven by the controller 206, selects, for input to a correlator 203, the received signal r or else the output from the storage unit 202.

In this way, initially, in addition to being stored in the storage unit 202, the received signal r is sent directly to the correlator 203, where it is correlated with a first midamble code, which belongs to the codegroup obtained from the second step of cell search and is generated by a midamble-code generator 204 driven by the controller 206.

Subsequently, upon appropriate selection by the multiplexer 201, driven by the controller 206, the replica of the received signal r stored in the storage unit 202 is sent to the correlator 203, where it is correlated with a second midamble code, which belongs to the codegroup obtained from the second step of the cell search and is generated by the midamble-code generator 204 driven by the controller 206. The operation is repeated for all four midamble codes, and, in particular, for the long midamble code MPL, to obtain the corresponding energies, which enable identification, via a unit for detection of the maximum value 205 set downstream of the correlator 203 and a search in an appropriate look-up table performed in a comparison block 207, of the scrambling codes SCR corresponding to the cell.

FIG. 4 shows a device for implementing the channel-estimation procedure.

A demultiplexer 250 divides, in the received signal r, the received midamble $e_{midamble}$ from the data D, under the control of appropriate control signals SC. The received midamble $e_{midamble}$ is sent at input to a multiplexer 251 and to a storage unit 252. Said storage unit 252, in particular, stores the aforementioned sequence of last chips, which has a length L=KW. There is further provided a channel-estimation controller 256 for controlling operation of the device. The multiplexer 251 driven by the channel-estimation controller 256 selects, for input to a correlator 253, the received midamble $e_{midamble}$ or else the output from the storage unit 252. The channel-estimation controller 256 also suitably generates the control signals SC for the demultiplexer 250.

In this way, initially, in addition to being stored in the storage unit 252, the received midamble $e_{midamble}$ is sent directly to the correlator 253, where it is correlated with an expected midamble code mid generated by a midamble-code generator 254 driven by the channel-estimation controller 256. The correlation energy thus calculated is used to obtain the vector of channel estimates $h_w$ from a buffer of channel coefficients 255.

By enabling the output of the storage unit 252, the correlations of the received midamble $e_{midamble}$ with the delayed replicas of the expected midamble mid can be executed.

It is to be noted that the midamble-code generator 254 contains both the generator of short midamble MPS (256 chips) and the generator of long midamble MPL (512 chips). For use in the channel estimator, there is also introduced a small delay line from which the signal to be sent to the correlator can be appropriately tapped.

Subsequent correlations can be carried out by sending the content of the storage unit 252 to the correlator 253.

Figure 5:
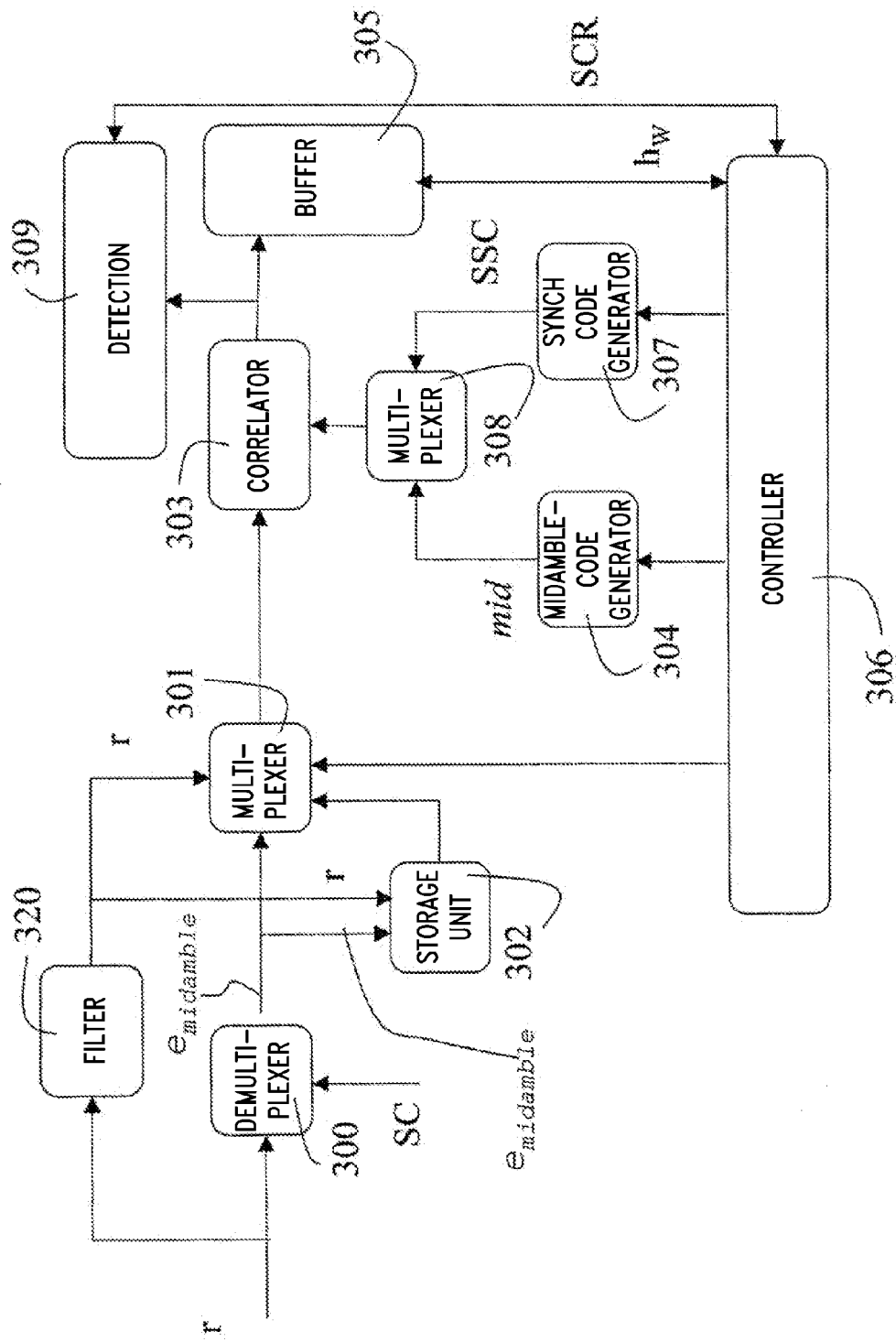
FIG. 5 represents a comprehensive apparatus for implementing the cell-search procedure and the channel-estimation procedure according to one embodiment of the invention.

It may be noted that the architectures illustrated in FIGS. 3 and 4 present similarities both as regards their structures and as regards their operation, so that, with reference to FIG. 5, an apparatus is proposed for implementing both the cell-search procedure and the channel-estimation procedure, which exploits said similarities for recycling the hardware resources available.

In said device, the received signal r is sent to a FIR filter 320 operating on the first sequence SSC for filtering a first subsequence composing the sequence SSC. In fact, said sequence SSC, which is 256 chips long, is constructed starting from two sequences of length 16, the first one of which is common to all the sequences SSC.

The received signal r is moreover sent to a demultiplexer 300, similar to the demultiplexer 250 of FIG. 4, which thus produces the received midamble $e_{midamble}$ under the control of the control signals SC. Said received midamble $e_{midamble}$ is sent at input to a multiplexer 301 and to a storage unit 302. A general controller 306 is moreover provided for controlling the operation of the circuit. The multiplexer 301 driven by the general controller 306 selects, for input to a correlator 303, the received midamble $e_{midamble}$, or else the output from the storage unit 252, or else the received signal r taken downstream of the FIR filter 320. The received signal r is also stored in the storage unit 302.

Figure 1:
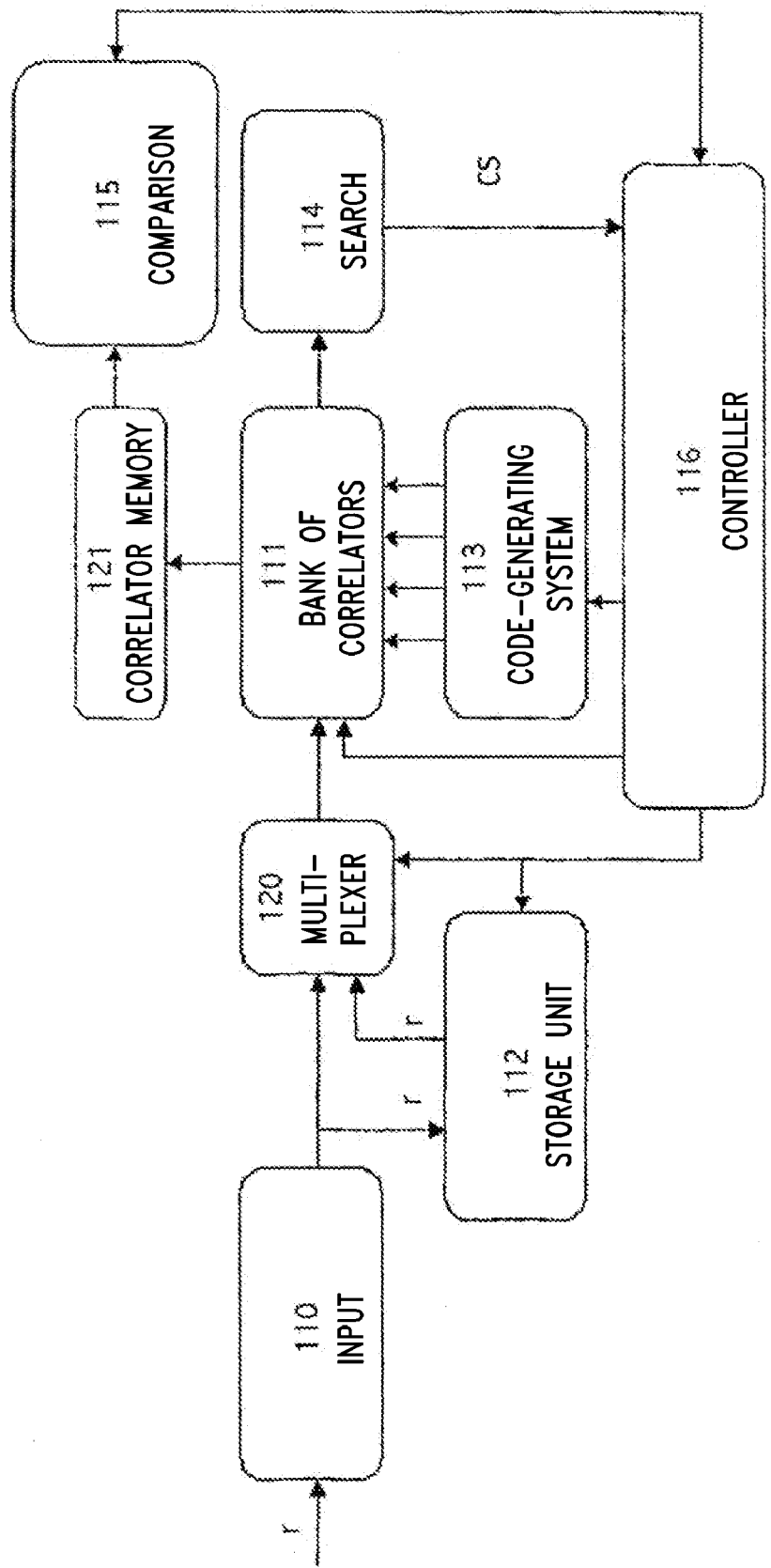
FIGS. 1 and 2, which in themselves regard the known art, have already been described in the foregoing.
Figure 2:
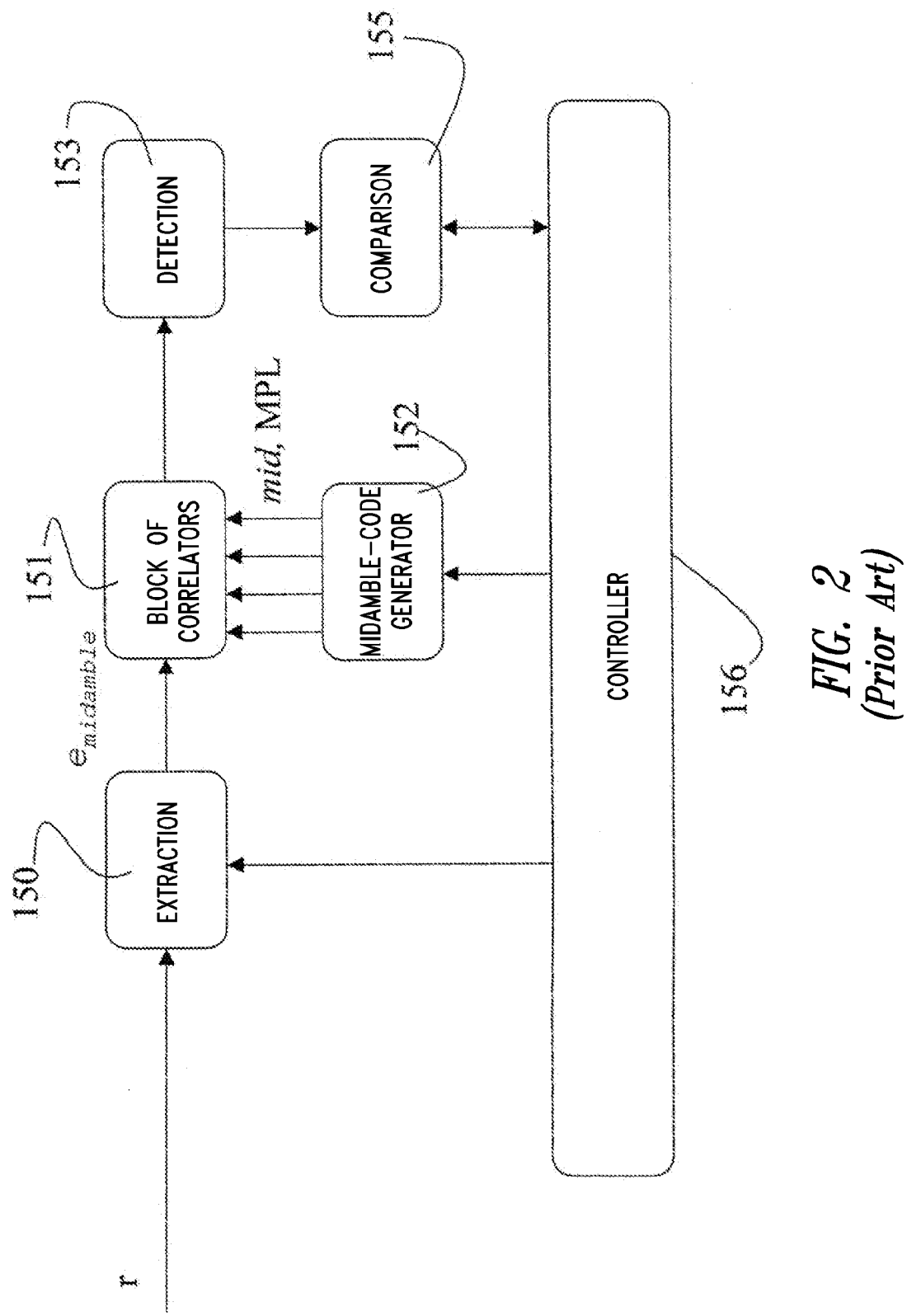

Placed downstream of the multiplexer 301 is then the aforementioned correlator 303, the correlation energy of which at output is sent for a correspondence search to a buffer of the channel coefficients 305 or else to a block designated by the reference number 309 comprising a unit for detection of the maximum value, such as the unit 205 of FIG. 2 for the third step or the unit 114 of FIG. 1 for the second step. Also placed downstream of the multiplexer 301 is a corresponding comparison block for performing the searches in the look-up tables. The general controller 306 supervises, in a way similar to what has been described previously, the operation of said units and moreover drives a midamble-code generator 304 and a generator of synchronization codes 307, the outputs of which are selected via an appropriate multiplexer 308, the output of which is supplied to the correlator 303.

Operation of the architecture represented in FIG. 5 follows substantially that of the architectures of FIGS. 3 and 4, appropriately sharing access to the shared hardware resources, in particular access to the correlator 303, according to different time intervals.

Initially, the second step of the cell-search procedure is executed. In this case, the multiplexer 301, driven by the general controller 306, selects the received signal r, for its input to the correlator 303, and, subsequently, its copy stored in the storage unit 302, whilst the multiplexer 308 selects the output of the synchronization-code generator 307.

Subsequently, the third step of the cell-search procedure is executed. In this case, the multiplexer 301, driven by the general controller 306, selects, for its input to the correlator 303, the received midamble $e_{midamble}$ coming from the demultiplexer 300 and, subsequently, its copies stored in the storage unit 302. In this case, the multiplexer 308 selects the output of the midamble-code generator 304.

Finally, the channel-estimation procedure is executed. In this case, once again, the multiplexer 301, driven by the general controller 306, selects, for its input to the correlator 303, the received midamble $e_{midamble}$, coming from the demultiplexer 300 and, subsequently, its copies stored in the storage unit 302 for correlation with the delayed replicas of the expected midamble mid sent to the correlator 303 by the midamble-code generator 304 appropriately selected by the multiplexer 308 driven by general controller 306. The correspondence searches for the correlation energies, obtained from the correlator 303 in the channel-coefficients buffer 305 or in the block 309 corresponding to the steps of cell search, are likewise controlled by the general controller 306 according to an appropriate timing.

The solution just described enables considerable advantages to be achieved as compared to known solutions.

The generated circuit proves to be, in fact, considerably smaller than known architectures.

In particular, advantageously, a reduction is achieved in terms of hardware and area occupied on the chip, of which provided herein is one example of the advantages in terms of memory required as compared to the known architectures with separate systems of the type illustrated in FIGS. 1 and 2.

For the above architectures there are needed six correlators and one FIR filter matched on the first sequence SSC, as well as two multiplexers, two units for detection of the maximum value and two midamble-code generators. In terms of memory occupation, it is necessary to allocate 320 bits for the second step of cell search, 6 Kb for the third step of cell search, and 6 Kb for the buffer of the channel estimator.

The solution proposed requires, instead, just one correlator and one FIR filter matched on the first sequence SSC, as well as two multiplexers, one unit for detection of the maximum value and one midamble-code generator. In terms of memory occupation, it is necessary to allocate only 6 Kb for the buffer of the channel estimator.

Of course, without prejudice to the principle of the invention, the details of implementation and the embodiments may vary widely with respect to what is described and illustrated herein, without thereby departing from the scope of the present invention, as defined in the attached claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method for performing, according to a received signal, a channel-estimation procedure and a cell-search procedure in cellular communication systems, the cell-search procedure including a first process of acquisition of a primary synchronization code, a second process for slot synchronization and identification of a group code, and a third process for identification of scrambling codes, said cell-search procedure including, in said second process, at least one first operation of correlation of said received signal with secondary synchronization codes and in said third process a second operation of correlation of said received signal with known midamble codes, said channel-estimation procedure including a third operation of correlation of at least part of said received signal with known midamble codes, said first, second, and third correlation operations being executed by sending the received signal or at least part of said received signal to an input of a correlation bank, the method comprising:

sending, in a first time interval corresponding to the second process of the cell-search procedure, the received signal to said correlation bank for executing the first operation of correlation of said received signal with secondary synchronization codes;

sending, in a second time interval corresponding to the third process of the cell-search procedure, at least part of the received signal to said same correlation bank for executing the second operation of correlation of said received signal with known midamble codes; and sending, in a third time interval, at least part of said received signal to said same correlation bank for executing the third operation of correlation of at least part of said received signal with known midamble codes, and obtaining channel coefficients.

2. The method according to claim 1 wherein said operations of sending comprise a selection operation for selecting an input to said correlation bank.

3. The method according to claim 2, further comprising storing said received signal or part of said received signal.

4. The method according to claim 3, further comprising extracting from the received signal at least one part associated to a received midamble.

5. The method according to claim 1, further comprising:
supplying to a further input of said correlation bank in said first time interval the synchronization codes; and
supplying to said correlation bank in said second time interval and third time interval the known midamble codes for executing, respectively, the first, second, and third correlation operations.

6. The method according to claim 5 wherein said supplying operations comprise an operation of selection of the input to said correlation bank.

7. The method according to claim 5 wherein said correlation bank comprises just one correlator.

8. An apparatus to perform, according to a received signal, a cell-search procedure and the channel-estimation procedure in a cellular communication system, which uses a plurality of synchronization codes, the apparatus comprising:

at least one first correlator, which receives said received signal and a plurality of synchronization codes to execute a second process of said cell-search procedure;

at least one second correlator that receives at least part of said received signal and known midamble codes to execute a third process of said cell-search procedure;

at least one third correlator that receives at least part of said received signal and known midamble codes to execute the channel-estimation procedure, to obtain corresponding energy values, said first correlator, second correlator, and third correlator including at least in part a single correlator; and at least one selector, which is able to control switching of an input of said single correlator to operate selectively on said received signal or at least part of said received signal.

9. The apparatus according to claim 8 wherein placed upstream of said at least one selector is an extraction module to extract from the received signal at least one part associated to a received midamble.

10. The apparatus according to claim 8 wherein placed downstream of said single correlator are units for determination of energy values to seek, between said energy values, at least one maximum value, to identify, according to said at least one maximum value, a given number of said midamble codes or synchronization codes.

11. The apparatus according to claim 10, further comprising a midamble-code generator and a synchronization-code generator connected in parallel to said single correlator through at least one respective selector.

12. The apparatus according to claim 11 wherein the received signal is sent in parallel to said at least one extraction module to extract from the received signal at least one part associated to a received midamble and to a FIR filter designed to acquire a primary synchronization code and wherein an output of said FIR filter is sent as input to said at least one selector.

13. The apparatus according to claim 11, further comprising a storage unit designed to store the received signal and the received midamble and to supply them as input to said at least one selector under a command of a control module.

14. The apparatus according to claim 13 wherein said control module is designed to control also said at least one selector, said at least one respective selector, the midamble-code generator and the synchronization-code generator, and the units for determination of energy values to perform, according to a distinct timing, the cell-search procedure and the channel-estimation procedure.

15. The apparatus according to claim 8 wherein the apparatus is configured to receive a signal in conformance with 3GPP standard TDD mode.

16. The apparatus according to claim 8 wherein the correlators comprise parts of a receiver for a telecommunications device based upon a standard from a group consisting of 3GPP TDD UMTS, CDMA2000, IS95, WBCDMA.

17. An article of manufacture, comprising:

a computer-readable medium that stores computer-executable instructions that are executable by a computer, to:
perform, according to a received signal, a channel-estimation procedure and a cell-search procedure in a wireless communication system, the cell-search procedure including a first process of acquisition of a primary synchronization code, a second process for slot synchronization and identification of a group code, and a third process for identification of scrambling codes, the cell-search procedure including, in the second process, at least one first operation of correlation of the received signal with secondary synchronization codes and in the third process a second operation of correlation of the received signal with known midamble codes, the channel-estimation procedure including a third operation of correlation of at least part of the received signal with known midamble codes, the first, second, and third correlation operations being executed by sending at least part of the received signal to an input of a correlation bank;

send, in a first time interval corresponding to the second process of the cell-search procedure, the received signal to the correlation bank to execute the first operation of correlation of the received signal with secondary synchronization codes;

send, in a second time interval corresponding to the third process of the cell-search procedure, at least part of the received signal to the same correlation bank to execute the second operation of correlation of the received signal with known midamble codes; and send, in a third time interval, at least part of the received signal to the same correlation bank to execute the third operation of correlation of at least part of the received signal with known midamble codes, and obtaining channel coefficients.

18. The article of manufacture of claim 17 wherein the computer-executable instructions include computer-executable instructions that are executable by said computer, to:

select an input to the correlation bank.

19. The article of manufacture of claim 17 wherein the computer-readable medium further stores computer-executable instructions that are executable by said computer, to:

store the received signal or at least part of the received signal;

extract from the received signal at least one part associated to a received midamble;

supply the synchronization codes to the correlation bank in the first time interval; and supply the known midamble codes to the correlation bank in the second and third time intervals.

20. A system, comprising:

means for performing, according to a received signal, a channel-estimation procedure and a cell-search procedure in a wireless communication network, the cell-search procedure including a first process of acquisition of a primary synchronization code, a second process for slot synchronization and identification of a group code, and a third process for identification of scrambling codes, the cell-search procedure including, in the second process, at least one first operation of correlation of the received signal with secondary synchronization codes and in the third process a second operation of correlation of the received signal with known midamble codes, the channel-estimation procedure including a third operation of correlation of at least part of the received signal with known midamble codes, the first, second, and third correlation operations being executed by sending at least part of the received signal to an input of at least one correlator;

means for providing the received signal to the at least one correlator to execute the first operation of correlation of the received signal with secondary synchronization codes;

means for providing at least part of the received signal to the at least one correlator to execute the second operation of correlation of the received signal with known midamble codes; and means for providing at least part of the received signal to the at least one correlator to execute the third operation of correlation of at least part of the received signal with known midamble codes, and for obtaining energy values.

21. The system of claim 20, further comprising:

means for storing the received signal or at least part of the received signal;

means for extracting from the received signal at least one part associated to a received midamble;

means for supplying the synchronization codes to the at least one correlator in a first time interval; and means for supplying the known midamble codes to the correlation bank in second and third time intervals.

22. The system of claim 20, further comprising:

means for generating midambles and synchronization codes;

means for selecting an input to the at least one correlator; and means for controlling the means for generating and the means for selecting.

23. A system usable with a wireless communication network, the system comprising:

a wireless device that uses synchronization codes, the wireless device including:

a first module to perform a cell-search procedure based on a signal;

a second module to perform a channel-estimation procedure;

a first component to receive the signal and a plurality of synchronization codes, and to perform slot synchronization and group code identification as part of the cell-search procedure;

a second component to receive at least part of the signal and midamble codes, and to perform scrambling code identification as part of the cell-search procedure; and a third component to receive at least part of the signal and midamble codes, and to perform the channel-estimation procedure to obtain energy values, wherein the first, second, and third components form parts of at least one correlator.

24. The system of claim 23, further comprising a selector upstream of the correlator to control input switching of the correlator.

25. The system of claim 24, further comprising a midamble-code generator and a synchronization-code generator coupled to the correlator through the selector.

26. A system usable with a wireless communication network, the system comprising:

a wireless device that uses synchronization codes, the wireless device including:

a first module to perform a cell-search procedure based on a signal;

a second module to perform a channel-estimation procedure;

a first component to receive the signal and a plurality of synchronization codes, and to perform slot synchronization and group code identification as part of the cell-search procedure;

a second component to receive at least part of the signal and midamble codes, and to perform scrambling code identification as part of the cell-search procedure;

a third component to receive at least part of the signal and midamble codes, and to perform the channel-estimation procedure to obtain energy values; and an extraction module to extract from the received signal at least one part associated to a midamble.

27. The system of claim 26 wherein the first, second, and third components form parts of at least one correlator.

28. The system of claim 27, further a selector upstream of the correlator to control input switching of the correlator.

* * * * *

UNITED STATES PATENT AND TRADEMARK OFFICE
CERTIFICATE OF CORRECTION

| | | |
|---|---|---|
| PATENT NO. | : 7,480,354 B2 | |
| APPLICATION NO. | : 11/051561 | |
| DATED | : January 20, 2009 | |
| INVENTOR(S) | : Francesco Rimi et al. | |

It is certified that error appears in the above-identified patent and that said Letters Patent is hereby corrected as shown below:

Title Page
Item (73) Assignee, "STMicroelectronic S.r.l., Agrate Brianza (IT)" should read as -- STMicroelectronics S.r.l., Agrate Brianza (IT) --

Item (57) Abstract, lines 10-11, "said first, second and third correlation operation being executed by sending at least" should read as -- said first, second and third correlation operations being executed by sending at least --

Column 9
Line 55, "a cell-search procedure and the channel-estimation procedure" should read as -- a cell-search procedure and a channel-estimation procedure --

Lines 61-64, "execute a second process of said cell-search procedure; at least one second correlator that receives at least part of said received signal and known midamble codes to execute a third process of said cell-search procedure;" should read as -- execute a first process of said cell-search procedure; at least one second correlator that receives at least part of said received signal and known midamble codes to execute a second process of said cell-search procedure; --

Column 10
Lines 23-24, "received signal is sent in parallel to said at least one extraction module" should read as -- received signal is sent in parallel to at least one extraction module --

Lines 30-31, "a storage unit designed to store the received signal and the received midamble" should read as -- a storage unit designed to store the received signal and a received midamble --

UNITED STATES PATENT AND TRADEMARK OFFICE
CERTIFICATE OF CORRECTION

PATENT NO. : 7,480,354 B2
APPLICATION NO. : 11/051561
DATED : January 20, 2009
INVENTOR(S) : Francesco Rimi et al.

It is certified that error appears in the above-identified patent and that said Letters Patent is hereby corrected as shown below:

Column 12
Line 64, "further a selector upstream of" should read as -- further comprising a selector upstream of --

Signed and Sealed this

First Day of December, 2009

David J. Kappos
*Director of the United States Patent and Trademark Office*